UNITED STATES PATENT OFFICE.

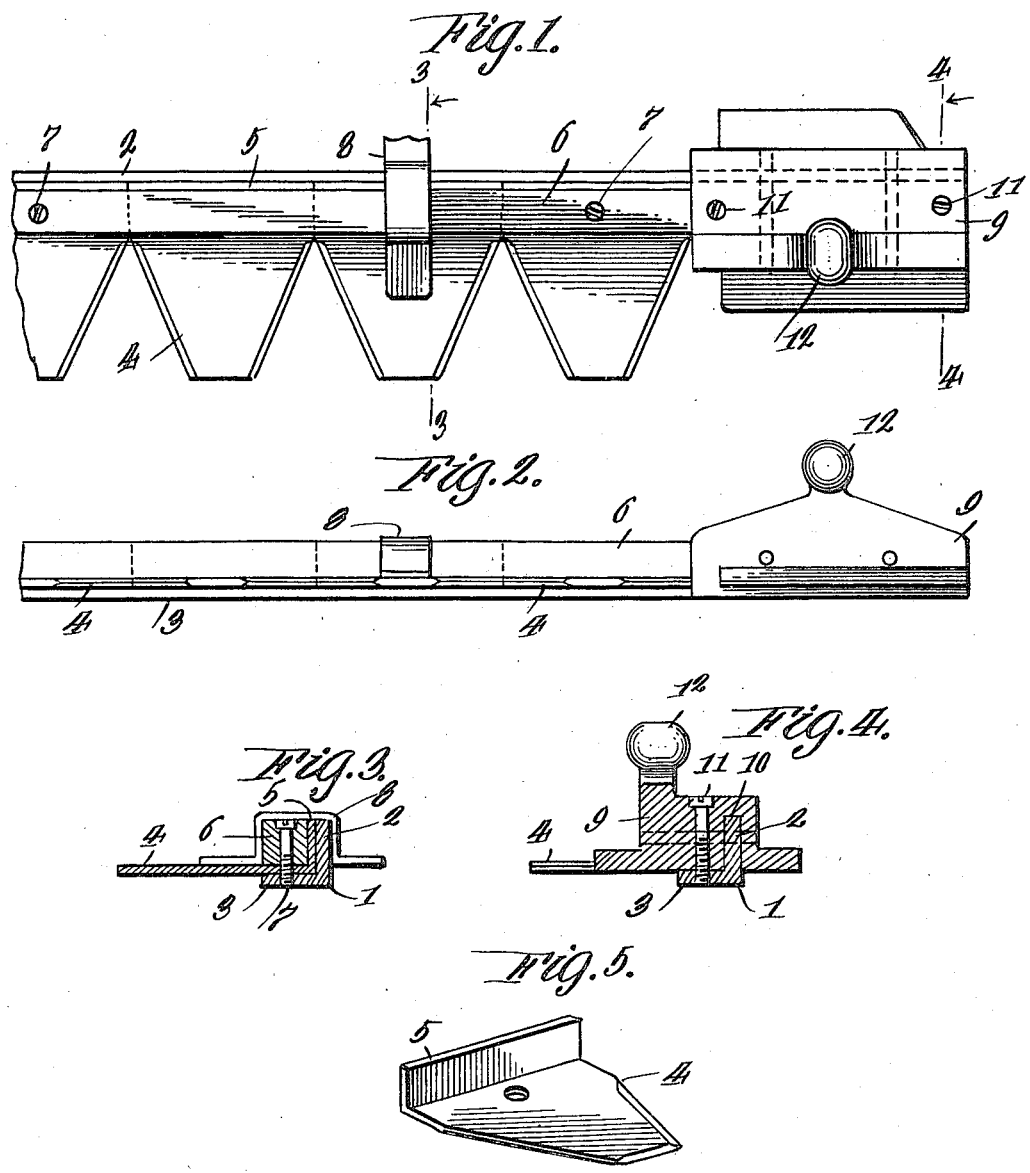

WILLIAM J. VANSTORY, OF RIENZI, MISSISSIPPI.

MOWING-MACHINE CUTTER.

1,322,977.  Specification of Letters Patent.  Patented Nov. 25, 1919.

Application filed February 5, 1919. Serial No. 275,183.

*To all whom it may concern:*

Be it known that I, WILLIAM J. VANSTORY, a citizen of the United States, residing at Rienzi, in the county of Alcorn and State of Mississippi, have invented certain new and useful Improvements in Mowing-Machine Cutters, of which the following is a specification.

The invention relates to cutting mechanism for agricultural machinery such as mowers and harvesters, the purpose being to provide a cutter of the type embodying a bar and a plurality of cutting sections detachably connected thereto, whereby the sections may be easily and quickly removed and replaced as may be required either for sharpening or to substitute new sections for such sections that may not be fit for further effective service.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the drawing,

Figure 1 is a top plan view of the inner portion of a mower cutter embodying the invention.

Fig. 2 is a front view of the part illustrated in Fig. 1.

Fig. 3 is a sectional detail on the line 3—3 of Fig. 1 looking to the left, as indicated by the arrow.

Fig. 4 is a sectional detail on the line 4—4 of Fig. 1 looking to the left, as designated by the arrow.

Fig. 5 is a detail perspective view of one of the cutting sections.

Corresponding and like parts are referred to in the following description and indicated in the several views of the drawing by like reference characters.

The cutter comprises a main bar 1 which in cross section is of L form and disposed relatively with one of its wings as 2 in vertical position and the remaining wing 3 in horizontal position. A plurality of cutting sections 4 is secured to the bar 1 and each of the sections has a rear portion extending vertically, as indicated at 5. The cutting sections 4 have their opposite edges beveled and reversely inclined. The rear portions have their side edges parallel so that when the cutting sections are in position upon the bar their rear portions abut, as indicated most clearly in Fig. 1. The cutting sections 4 rest upon the horizontal wing 3 of the main bar and their upturned portions 5 bear against the vertical wing 2 of the main bar. A confining bar 6 is disposed in the angle formed between the cutting sections and their upturned portions and is secured to the main bar 1 by suitable fastening means such as machine screws 7. Certain of the cutting sections 4 are formed with openings to receive the fastenings 7. In this manner the cutting sections are clamped by the bar 6 against the inner faces of the wings 2 and 3 of the main bar 1. Upon removing the fastenings 7 the cutting sections 4 may be removed so as to be readily sharpened or to be replaced by other sections should occasion be found desirable to substitute different cutting sections for those previously used. It is to be understood that the cutter bar is adapted to be used in connection with a ledger plate or companion cutter, not shown. A guide 8 extends over the bar and is adapted to be secured at one end to the fixed bar, not shown, whereas its opposite end is in contact with the upper face of a cutting section thereby retaining the cutter in proper position and directing the same in its reciprocating movements. The confining bar 6 is preferably of square form in cross section, as shown most clearly in Fig. 3.

The head 9 at the inner end of the cutter preferably consists of a casting in which is formed a groove 10 to receive the vertical wing 2 of the main bar 1, said head resting upon the horizontal wing 3 to which it is secured by means of suitable fastenings 11. A rounded projection 12 is disposed upon the upper side of the head 9 and is adapted to receive the pitman, not shown, by means of which a reciprocating movement is imparted to the latter when the latter is in position.

The foregoing description and the drawing have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In cutting mechanism for mowers, harvesters and the like, an L bar disposed with one of its wings horizontally and the remaining wing vertically, cutting sections having their rear portions seated on the bar with their edges in contact and their rear portions upturned and in contact with the inner face of the vertical wing and a confining bar disposed in the angular space formed between the cutting sections and their rear upturned portions and secured to one of the wings of the bar.

2. In cutting mechanism for mowers, harvesters and the like, a cutter bar of L form, cutting sections seated on one wing of the bar and having their rear portions upturned and, in contact with the remaining wing of the bar, a confining bar of approximately square form disposed in the angular space formed between the cutting sections and their rear upturned ends and secured to the main bar, and a guide and keeper extending over the main and confining bars and having an end portion in contact with a cutting section.

In testimony whereof I affix my signature in presence of two witnesses.

WILLIAM J. VANSTORY.

Witnesses:
E. C. GREEN,
T. S. CHEWS.